(12) United States Patent
Bianciotto et al.

(10) Patent No.: US 12,548,652 B2
(45) Date of Patent: Feb. 10, 2026

(54) CLASSIFYING IMAGES OF DOSE-RESPONSE GRAPHS

(71) Applicant: Sanofi, Paris (FR)

(72) Inventors: Marc Bianciotto, Paris (FR); Kun Mi, Paris (FR)

(73) Assignee: Sanofi, Paris (FR)

( * ) Notice: Subject to any disclaimer, the term of this patent is extended or adjusted under 35 U.S.C. 154(b) by 196 days.

(21) Appl. No.: 18/038,300

(22) PCT Filed: Nov. 29, 2021

(86) PCT No.: PCT/EP2021/083404
§ 371 (c)(1),
(2) Date: May 23, 2023

(87) PCT Pub. No.: WO2022/112568
PCT Pub. Date: Jun. 2, 2022

(65) Prior Publication Data
US 2024/0006055 A1    Jan. 4, 2024

(30) Foreign Application Priority Data

Nov. 30, 2020   (EP) .................................... 20315469

(51) Int. Cl.
*G16H 20/10*     (2018.01)
*G06V 10/426*    (2022.01)
(Continued)

(52) U.S. Cl.
CPC ........... *G16H 20/10* (2018.01); *G06V 10/426* (2022.01); *G06V 10/764* (2022.01); *G06V 10/82* (2022.01)

(58) Field of Classification Search
CPC ...... G06V 10/40; G06V 10/42; G06V 10/422; G06V 10/426; G06V 10/70–87;
(Continued)

(56) References Cited

U.S. PATENT DOCUMENTS

2009/0119337 A1    5/2009   Biedermann
2018/0372724 A1   12/2018   Khine et al.
(Continued)

FOREIGN PATENT DOCUMENTS

CA         2888064       5/2014
JP      2012-522226 A    9/2012
(Continued)

OTHER PUBLICATIONS

Bianciotto, Marc, et al. "AI4DR: Development and implementation of an annotation system for high-throughput dose-response experiments." Artificial Intelligence in the Life Sciences 3, p. 100063. (Year: 2023).*

(Continued)

*Primary Examiner* — Scott A Rogers
(74) *Attorney, Agent, or Firm* — Fish & Richardson P.C.

(57) ABSTRACT

A computer-implemented method of classifying images comprising dose-response graphs obtained from dose-response experiments. The method comprises receiving, at a curve shape classifier model, an input comprising image data including a plurality of pixels, wherein the image data represents an image of a dose-response graph indicating a relationship between the concentration of a compound and its activity. The curve shape classifier model comprises a neural network model configured for classifying images of dose-response graphs into a plurality of dose-response graph categories relating to curve shape. The method further comprises generating, using the neural network model, a classification output for the image represented by the received image data, said generating comprising processing the image data using one or more layers of the neural network model in accordance with parameters associated with the one or more layers.

18 Claims, 7 Drawing Sheets

(51) Int. Cl.
*G06V 10/764* (2022.01)
*G06V 10/82* (2022.01)

(58) Field of Classification Search
CPC ...... G16H 30/40; G16H 20/10; G06T 7/0012; G06T 2207/20008; G06T 2207/20084; G06T 2207/30004; G06F 18/2415; G06N 3/045; G06N 3/0464; G06N 3/08; G06N 3/09
See application file for complete search history.

(56) References Cited

U.S. PATENT DOCUMENTS

| | | | | |
|---|---|---|---|---|
| 2023/0253115 | A1* | 8/2023 | Bohannan | G16H 20/10 705/2 |
| 2024/0296928 | A1* | 9/2024 | Gaweda | A61B 34/10 |

FOREIGN PATENT DOCUMENTS

| | | |
|---|---|---|
| JP | 2020-526742 A | 8/2020 |
| WO | WO 2010/112168 A1 | 10/2010 |
| WO | WO 2019/005694 A1 | 1/2019 |
| WO | WO 2022/112568 | 6/2022 |

OTHER PUBLICATIONS

Campana, Pedro Alonso, Paul Prasse, and Tobias Scheffer. "Predicting dose-response curves with deep neural networks." Forty-first International Conference on Machine Learning. (Year: 2024).*

Sakai, Miyuki, et al. "Prediction of pharmacological activities from chemical structures with graph convolutional neural networks." Scientific reports 11.1, p. 525. (Year: 2021).*

JPO Search Report and Notice of Reasons for Refusal dated Aug. 29, 2025 for Japanese Application No. 2023-532447 (Year: 2025).*

Bazgir et al. "Representation of features as images with neighborhood dependencies for compatibility with convolutional neural networks." Nature communications, 11(1):4391, pp. 1-13 (Year: 2020).*

Bazgir et al., "Representation of features as images with neighborhood dependencies for compatibility with convolutional neural networks," Nature Communications, Sep. 1, 2020, 11:4391.

International Preliminary Report on Patentability in International Appln. No. PCT/EP2021/083404, mailed on Jun. 15, 2023, 8 pages.

International Search Report and Written Opinion in International Appln. No. PCT/EP2021/083404, mailed on Feb. 16, 2022, 10 pages.

LeCun et al., "Deep Learning," Nature, May 28, 2015, 521(7553):436-444.

Shockley, "Quantitative high-throughput screening data analysis: challenges and recent advances," Drug Discovery Today, Mar. 2015, 20(3):296-300.

Asarnow et al., "The QDREC web server: determining dose-response characteristics of complex macroparasites in phenotypic drug screens," Bioinformatics, Dec. 24, 2014, 31(9):1515-1518.

Huang, "A quantitative high-throughput screening data analysis pipeline for activity profiling," High-throughput Screening Assays in Toxicology, Springer, New York, Aug. 13, 2016, Chapter 12, pp. 111-122.

Office Action in Chinese Appln. No. 202180076504.X, mailed on Nov. 8, 2025, 15 pages (with English translation).

* cited by examiner

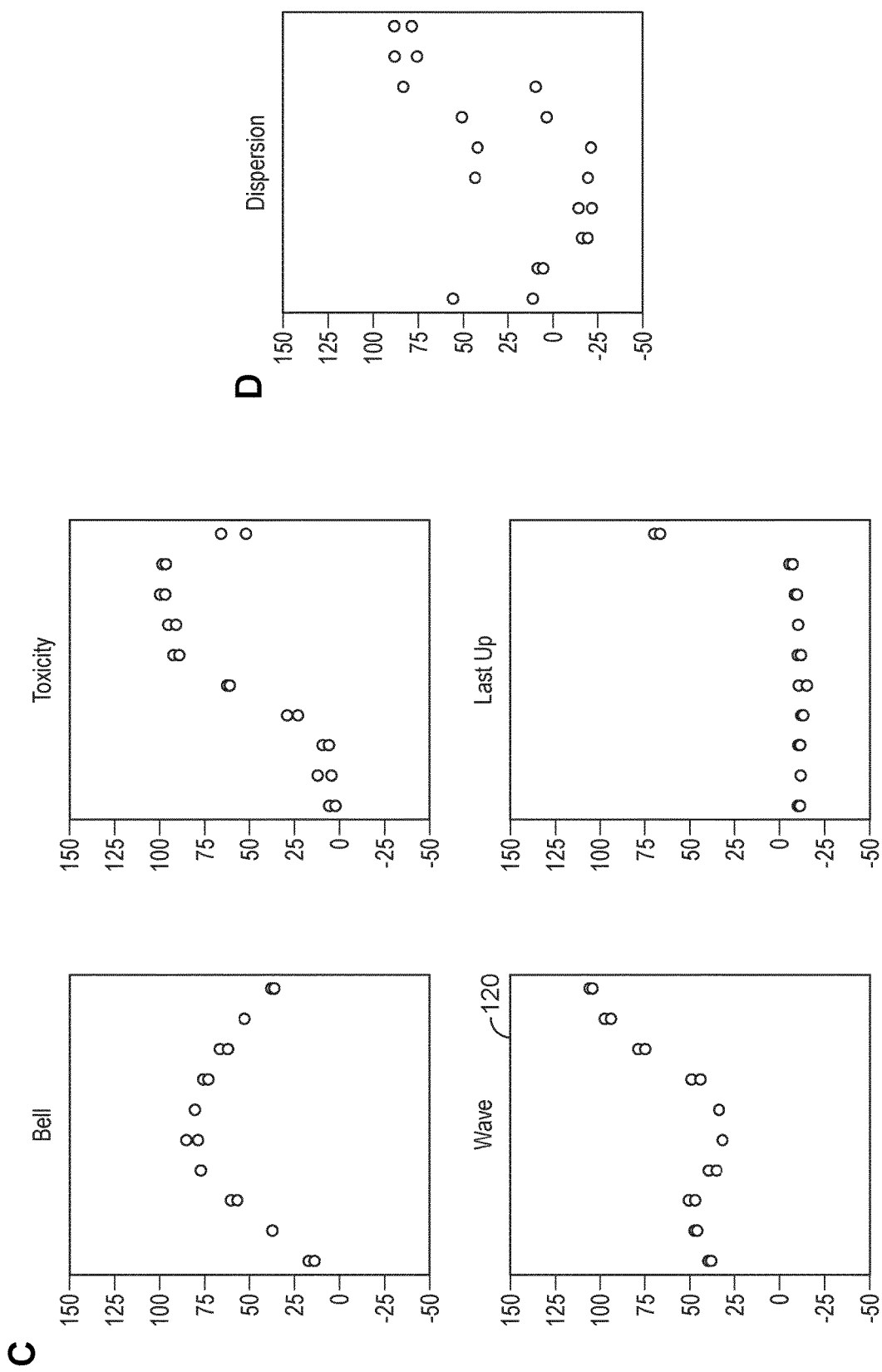

CLASSIFYING IMAGES OF DOSE-RESPONSE GRAPHS

CROSS REFERENCE TO RELATED APPLICATIONS

The present application is the national stage entry of International Patent Application No. PCT/EP2021/083404, filed on Nov. 29, 2021, and claims priority to Application No. EP 20315469.5, filed on Nov. 30, 2020, the disclosures of which are incorporated herein by reference.

TECHNICAL FIELD

The present disclosure relates to a computer-implemented method of classifying images comprising dose-response graphs obtained from a plurality of dose-response experiments.

BACKGROUND

At the dawn of drug discovery projects, a potential drug target is identified. The drug target is a molecule in the body, that is intrinsically associated with a particular disease process.

Depending upon the disease to be treated, the target may be a protein (e.g. a receptor protein, an enzyme, an ion channel or a transporter protein) or a nucleic acid (e.g. DNA). Researchers hypothesise that modifying the activity of the target with a drug will result in a desirable therapeutic effect.

Once a target has been identified, a test system is identified or developed which produces a detectable signal to assess the effect of compounds on the drug target. This test system is called an assay. Once an assay has been identified or developed, researchers can use it to identify compounds which have the desired activity. Typically, a compound will be tested at a number of concentrations and a dose-response (DR) graph can be generated. Analysis of the DR graph allows researchers to determine if a compound is active, and at what concentration.

Where it is desirable to test a large number of potential compounds High Throughput Screening (HTS) is often used. This uses robotics, data processing/control software, liquid handling devices and sensitive detectors, and allows researchers to quickly conduct thousands or even millions of screening tests. When testing all compounds at a number of concentrations to generate DR data, this is called quantitative HTS (qHTS).

However, the large amount of data generated at the dose-response (DR) step of a HTS campaign requires careful analysis by the researchers in order to detect artifacts and correct erroneous data points before validating the experiments. This step, which requires expert review of each DR experiment can be time consuming and prone to human errors or inconsistencies.

SUMMARY

This specification describes a computer-implemented method of classifying images comprising dose-response graphs obtained from dose-response experiments. The method comprises receiving, at a curve shape classifier model, an input comprising image data including a plurality of pixels, wherein the image data represents an image of a dose-response graph indicating a relationship between the concentration of a compound and its activity. The curve shape classifier model comprises a neural network model configured for classifying images of dose-response graphs into a plurality of dose-response graph categories relating to curve shape. In particular, each dose-response graph category may be associated with a respective curve shape which defines the dose-response relationship for the category.

The method includes generating, using the neural network model, a classification output for the image represented by the received image data, said generating comprising processing the image data using one or more layers of the neural network model in accordance with parameters associated with the one or more layers. The neural network model may comprise a convolutional neural network model.

Classifying images of dose-response graphs (rather than raw dose-response graph data) reduces the impact of any lack of homogeneity between different inputs to the classifier model, or between inputs used for prediction and the training data. Thus, the claimed approach provides for a flexible classifier which can classify dose-response graph images with e.g. different number of data points (e.g. 8, 10 or 12 concentrations), missing points and/or with different numbers of replicates.

The classification output may comprise a vector of probabilities, each probability representing a likelihood that the input represented by the received image data belongs to a respective one of the categories. Alternatively, or in addition, the classification output may indicate the category having the highest probability. In some examples the classification output may indicate the two (or more) most probable categories.

In an example implementation, a dose-response graph may be initially classified into a first or second dispersion category, wherein image data representing an image of the dose-response graph is processed using the curve shape classifier model only if the dose-response graph is classified in the first dispersion category. A dispersion classifier may be used to classify the dose-response graph into the first or second dispersion categories. The dispersion classifier may comprise a binary classifier. The second dispersion category may be a high dispersion category and the first category may be a category for other dose-response graphs (e.g. lower dispersion graphs) which are not in the second category. The dispersion classifier may classify dose-response graphs into the first or second dispersion categories (e.g. higher or lower dispersion categories) based on differences between measures of activity at the same concentration.

A dose-response graph may be classified by the dispersion classifier using the interquartile range and/or other quartiles values between replicates at all concentrations. An advantage of this approach is that there is no constraint with respect to the number of data points to consider, which means that the classifier is effective even if some data points are missing or if the number of concentrations are different between inputs to the dispersion classifier (or between inputs used for prediction and the training data). This benefit is synergistic with the use of images as input to the curve shape classifier and facilitates a flexible classification pipeline which reduces the impact of any inhomogeneity in the input data.

The dispersion classifier may comprise a trained machine learning model. In one example implementation, the dispersion classifier comprises a multi-layer perceptron neural network model.

The plurality of dose-response categories may include one or more (or all of):

a "Top" category for high activity across the whole concentration range;

a "No Bottom" category for sigmoid curves in which an upper asymptotic part is visible but a lower asymptotic part is not visible;

a "Sigmoid" category for well behaved sigmoid curves which include lower and upper asymptotic parts;

an "Active No Top" category for sigmoid curves in which the lower asymptotic part is visible but an upper asymptotic part is not visible and which reaches a 50% activity threshold and part of the dose-response graph after the inflexion point is visible;

a "No Top" category for weakly active compounds in the concentration range of the dose-response graph;

a "Non Active" category for non-active compounds in the concentration range of the dose-response graph;

a high slope category for sigmoid curves with a high slope at the $EC_{50}$;

a low slope category for sigmoid curves with a low slope at the $EC_{50}$;

a "partial" category for sigmoid curves in which the difference between A(c) at the upper and lower asymptotes is less than 70%;

a "wave" category in which there is an alternative increase and decrease of activity with respect to concentration, and a "last up" category in which no activity is shown except for the highest concentration or the two highest concentrations.

The plurality of dose-response categories may comprise:

a bell-shaped curve category, and/or a toxicity category for sigmoid curves with a decreased inhibition at higher concentration.

The bell-shaped curve category and toxicity category may be fused together into a single category for inference, but kept separate in training so that the model independently learns the slightly different visual pattern associated with each of these categories. These two categories are not always easily distinguished by experts. However, in embodiments described in this specification, these categories may, advantageously, be distinguished by the curve-shape classifier model since it operates on low-level features in the form of pixel data.

In another example implementation, this specification describes a computer-implemented method of producing a curve shape classifier model for classifying dose-response graphs obtained from dose-response experiments. The method comprises receiving a plurality of training images at a neural network model, wherein each training image is an image of a dose-response graph indicating a relationship between the concentration of a compound and its activity, generating an output for each training image, wherein generating the output for a training image comprises processing the training image through one or more layers of the neural network model in accordance with parameters associated with the one or more layers, and updating said parameters based on an objective function comprising a comparison between the generated output for each training image with corresponding label data associated with the training image, the label data indicating that the training image belongs to one or more dose-response graph categories relating to curve shape. The neural network model may comprise a convolutional neural network model.

In another example implementation, this specification describes a data processing apparatus comprising one or more processors configured to perform any of the computer-implemented methods described herein.

In another example implementation, this specification describes a computer-readable storage medium comprising instructions, which when executed by one or more processors, cause the one or more processors to perform any of the computer-implemented methods described herein.

As used herein, the term "dose-response graph" refers to a graph indicating a dose-response relationship between the concentration of a compound and its activity. A dose-response graph may for example comprise a set of data points plotted relative to Cartesian axes e.g. a horizontal (X) and vertical (Y) axes. In various embodiments, dose-response graphs may be obtained from a High Throughput Screening process. However, dose-response graphs may alternatively be obtained from other sources, for example from other screening processes such as low throughput screening. In the art, "dose-response graphs" may alternatively be referred to as "dose-response curves", although it is understood that the term "dose-response curve" does not necessarily imply the presence of a continuous curve.

The term $EC_{50}$ refers to the half maximal effective concentration of a compound, i.e. the concentration leading to 50% of the maximum response. Meanwhile, the term $IC_{50}$ refers to the half maximal inhibitory concentration, i.e. the concentration leading to 50% inhibition. It will be appreciated that dose-response graphs can measure activity other than inhibition, for instance a dose-response graph could measure the ability of compounds to act as an agonist of a biomolecule or organism. The claimed method may be used to classify dose-response graphs measuring any sort of activity. Accordingly, the term $EC_{50}$ will be used throughout this description, but may be understood to include embodiments where inhibition is being measured and the term $IC_{50}$ could be used.

The term A(c) used herein may be understood to refer to an observed activity (A) at a specific concentration (c) Similarly, the term I(c) may be understood to refer to an observed inhibition (I) at a specific concentration (c). The term A(c) will be used throughout this description, but may be understood to include embodiments where inhibition is being measured and the term I(c) could be used.

It may be appreciated that the term "activity" can be understood to refer to biological or biophysical activity. For instance, the dose-response graph may indicate the relationship between the concentration of the compound and its ability to act as an agonist, antagonist or allosteric modulator of a biomolecule or organism. Alternatively, or additionally, the dose-response graph may indicate the relationship between the concentration of the compound and its ability bind to a biomolecule or organism. A biomolecule or organism may be or may comprise a nucleophilic structure. The biomolecule or organism may be selected from the group consisting of an amino acid, a peptide, an affimer, a protein, a glycoprotein, a lipopolysaccharide, an antibody or a fragment thereof, a nucleic acid, an organic polymer, a virus, a bacterium, a parasite, a cell, and a cell-related structure. The protein may be or comprise a receptor, an enzyme, an ion channel and/or a transporter.

It may be appreciated that the computer-implemented methods described herein may be used to help identify compounds with a desired activity. These compounds may be taken forward as potential drug candidates. Alternatively, medicinal chemists may produce modified compounds based on or comprising the identified active compounds. The present disclosure extends to any drug, wherein the drug comprises or is based upon a compound which had been tested in a dose-response experiment and the results of the said experiment were classified using the computer-implemented method described herein. The present disclosure also extends to any drug, wherein the drug comprises or is based upon a compound which had been tested in a dose-response experiment and the results of the said experiment were classified using the computer-implemented method described herein, for use in therapy. The drug may be the compound which had been tested in the dose-response experiment.

The computer-implemented method described herein may be used to identify small molecules and/or biomolecules, such as, but not limited to, molecular biomarkers. The present disclosure also extends to small molecules or biomolecules that had been tested in a dose-response experiment and the results of the said experiment were classified using the computer-implemented method described herein.

BRIEF DESCRIPTION OF THE FIGURES

So that the present disclosure may be more easily understood, embodiments thereof will now be described by way of example only, with reference to the accompanying drawings in which.

DETAILED DESCRIPTION

Overview

Figure 1:
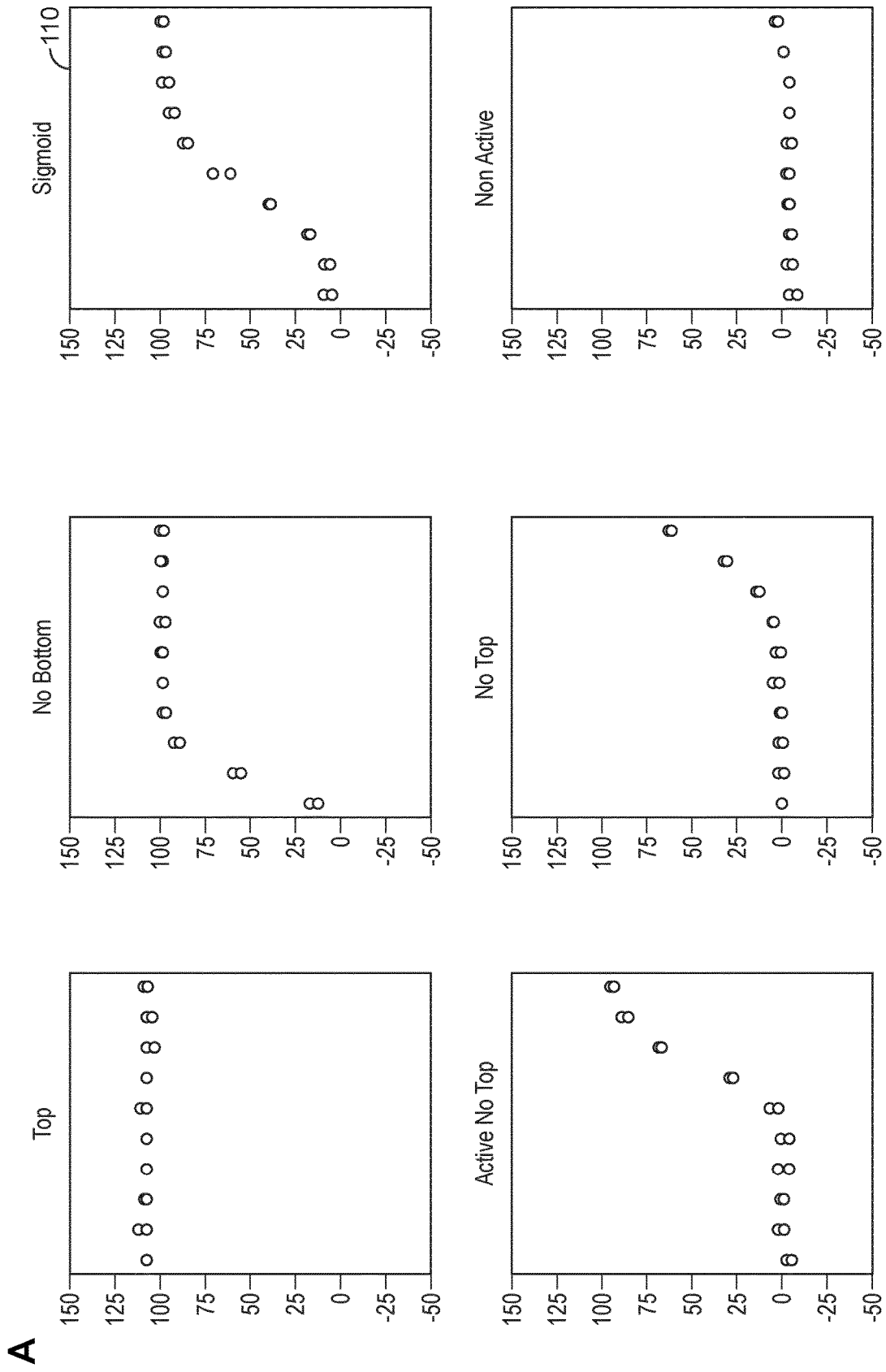
FIG. 1 illustrates an example set of dose-response graph categories.
Figure 1:
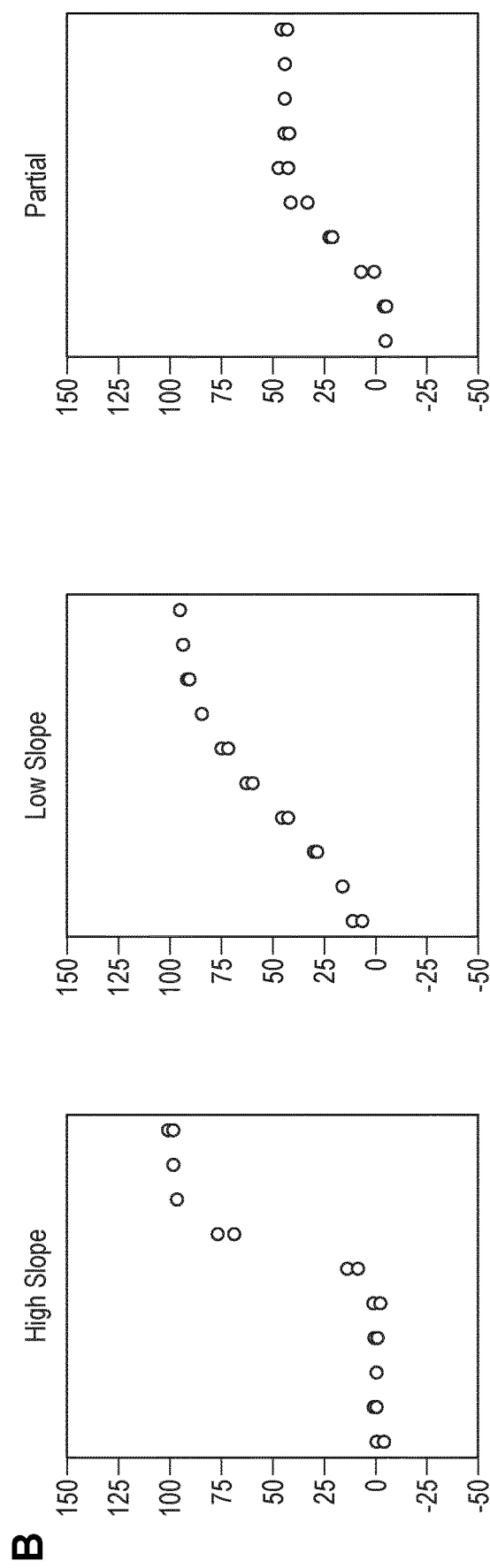

Various example implementations relate to a system for classification of dose-response (DR) graphs based on a neural network acting on normalized images of the DR graphs. The system may allow the annotation in minutes of thousands of curves among multiple categories to help High Throughput Screening (HTS) researchers in their analysis. Categories may be associated with active or inactive compounds, or with features of interest such as the presence of noise between replicates, a weaker effect at high doses that can be related to toxicity, aggregation or solubility issues, or a suspiciously weak or strong slope at the inflexion point of the DR graphs of actives.

INTRODUCTION

High Throughput Screening (HTS) is one of the major strategies used in the pharmaceutical industry for hit finding. Lately, screening technologies have become more sophisticated, leading to approaches like quantitative HTS and strategies where more counter-screens or selectivity assays are used to qualify hits. In turn, these techniques have raised the volume of dose-response (DR) results generated. Other large dose-response datasets are obtained after the interrogation of protein libraries by selection techniques such as phage display, yeast display or fluorescence-activated cell sorting (FACS). The quality of the dose-response data is dependent on the screening conditions, protocols and overall assay robustness, and on the behavior of the compounds. The basic automatic analysis of the dose-response relationship relies on a fitting algorithm which might be unreliable in suboptimal settings because of the presence of outliers due to interference effects or other technical artifacts. In practice, dose-response data needs to be manually reviewed and acted upon in order to lead to a decision concerning the follow-up of the corresponding compound in the project. Thus, the visual inspection step is time consuming, even more so when the hit rate is high, and the outcome of this step is dependent on the quality of the curves, the experience of the expert and the time available for analysis. When dealing with large amounts of results, this approach can delay the project and may lead, over time, to a lack of consistency and robustness in the analyses.

When an active compound has an $EC_{50}$ (the concentration leading to 50% of the maximum response, be it inhibition or other activity measurement) within the concentration range of the assay, the ideal shape of its DR curve is either a full sigmoid, with its low and high asymptotes well defined, or a portion of it. Ideal dose-response graphs can be flat, either because the compound shows its maximum activity, or no activity at all, in the whole concentration range. However, there are many reasons why a DR experiment can be perturbed, leading to curves that do not belong to these ideal shapes. Some are only related to the compound properties (e.g. colloidal aggregation or toxicity issues at high concentration), others also depend on the cell line or on the experiment protocol (e.g. colored and fluorescent compounds interfere with luminescence assays).

The standard post-processing workflow of DR graphs consists in using the Hill equation to fit the inhibition percentage A(c) to a sigmoid and extracting several parameters, such as $EC_{50}$ and its confidence interval, the slope at $EC_{50}$, A(c) at the top and the bottom asymptotes. The Hill equation is known per se to those skilled in the art and will not be described here. Reference is directed to "Handbook of Drug Screening"; Seethala, R.; Zhang, L., Eds.; Drugs and the Pharmaceutical Sciences; CRC Press: 2009, and Shockley, K. R. "Quantitative high-throughput screening data analysis: challenges and recent advances", Drug Discovery Today 2015, 20, 296-300.

The extracted parameters alone are not enough to fully characterize the activity of a compound. Visual inspection of the DR graphs is thus typically performed, which may involve masking outliers to generate a better fit, confirming or adjusting the fitted parameters (top and bottom asymptotes, $EC_{50}$, slope), spotting invalid experiments for re-testing, annotating valid curves displaying defects or specificities and tagging each curve with a final decision label: "Active"(A), "Non Active" (NA) or "Non Valid" (NV). This curation step by experts goes with challenges: it is time-consuming, it can be expert-dependent, and even a single expert can face consistency issues when annotating borderline cases at different times.

In order to alleviate these difficulties, the present specification describes a computer-implemented method for the automated classification of DR graphs according to their visual characteristics. In particular, as described in more detail below, classification may be based on the visual pattern of the dose-response relationship which may be defined by the shape of the dose-response curve. The system includes a neural network image classifier in the form of a convolutional neural network model which is configured by its training to classify received DR graph images into a plurality of DR graph categories.

In an example implementation, described below, 14 different categories defined by experts can be given by the system, together with a classification probability. This solution allows experts to group together similar DR graphs in categories with interpretable labels according to their visual similarity in order to perform batch operations on them, and to easily identify the less well predicted curves for an in-depth review. The system improves the speed of the inspection step and the robustness and consistency of the final decision.

Data Strategy

FIG. 1 illustrates examples of DR graphs in 14 categories together with the associated category labels. Each category has an associated label and the two terms ("category" and "label") will be used synonymously.

The 14 categories include 13 categories (sets A, B and C) which can be associated with a well-defined curve shape.

Of these, six categories form a first group (set A) with different levels of activity and no flaws (e.g. no defects or extreme parameters):

"Top" represents a highly potent compound exhibiting full signal inhibition along the whole concentration range, "No Bottom" corresponds to potent compounds with a sigmoid inhibition curve where the upper asymptote is visible but not the lower one, "Sigmoid" is for the well-behaved sigmoid curve of active compounds, including lower and upper asymptotes, "Active No Top" stands for a DR graph which includes the lower asymptote but not the upper one and reaches the 50% inhibition threshold, wherein part of the DR graph after the inflexion point is visible, "No Top" is for weakly active compounds in the concentration range of the assay, "Non Active" DR graphs are for compounds that are inactive in the assay.

A second group of 3 categories (set B) correspond to sigmoid DR graph with some extreme parameters:

"High Slope" stands for full sigmoid DR graph with a high slope at the $EC_{50}$ (typically nHill>4), "Low Slope", conversely, describes full sigmoid DR graph with a low slope at the $EC_{50}$ (typically nHill<0.5).

These patterns can be observed when cooperativity effects take place in the system.

"Partial" label is for full sigmoid DR graph where the relative maximal inhibition (the difference between A(c) at the upper and lower asymptotes) is less than 70%, which is frequently observed in cellular assays.

A third group (set C) comprises DR graphs which show defects that are commonly observed in practice:

In "Bell" DR graphs, A(c) decreases at the highest concentrations, leading to a bell-shape curve. This pattern could be due to a signal interference issue in a fluorescence assay format or to a compound aggregation issue.

The "Toxicity" ("Inverse effect at high concentration") label is also for full sigmoid inhibition curve with a sharply decreased inhibition at the highest concentrations due to the toxicity of the compound, as it is frequently observed in cellular assays. The "Toxicity" and "Bell" labels may be fused together in post-processing as discussed below.

In "Wave" DR graphs there is an alternative increase and decrease of A(c). This could be due to various issues, such as interferences in the signal readout or a problem in the compound dilution series.

The "Last up" label is for DR graphs where no inhibition is observed in the titration curve except for the highest compound concentration or two highest compound concentrations, leading to a non-valid curve, These categories may be associated with three higher order ensembles, "Clearly Active", "Clearly Inactive" and "Needs Review", this latter set being for all curves with specificities or defects. The "Top", "No Bottom", "Sigmoid", "Active No Top" categories are associated with the "Clearly Active" ensemble. The "Non Active" category is associated with the "Clearly Inactive" ensemble. The "No Top", "High Slope", "Low Slope", "Partial", "Bell", "Toxicity", "Wave", "Last Up" and "Dispersion" (see below) categories are associated with the "Needs Review" ensemble.

A human expert may visually inspect a DR graph and assign it to one of the 13 categories (sets A, B and C) based on the shape of the curve which defines the trend of the dose-response relationship. For example, the example DR graph 110 may be assigned to the "Sigmoid" category because a curve defining the trend of the dose-response relationship is sigmoidal. The DR graph 120 may be assigned to the "Wave" category because the curve has a wave shape, with an alternate increase and decrease in activity. Thus, as can be visually understood from FIG. 1, each of the 13 categories (sets A, B and C) may be associated with a respective curve shape which defines the dose-response relationship for the category. These categories may therefore be referred to herein as "shape categories".

Note that some categories may be associated with the same or similar curve shapes. For example, "Top" and "Non Active" have the same (horizontal) curve and may differ only in the magnitude of the response at each concentration. "Last Up" and "No Top" are also somewhat similar but may differ in that the curve for "Last Up" rises more steeply compared to "No Top".

As described in more detail below, an image classifier model may learn to classify images of DR graphs based on curve shape by training the classifier on images of DR graphs which have previously been classified by experts.

FIG. 1 also illustrates a "Dispersion" category (set D) in which noise is observed between replicates. Replicates are two or more measures performed at the same concentration value. Unlike the other categories, the "Dispersion" category is not associated with a particular shape but may nevertheless be handled separately as part of a classification pipeline as will now be described.

Classification Pipeline

Figure 2:
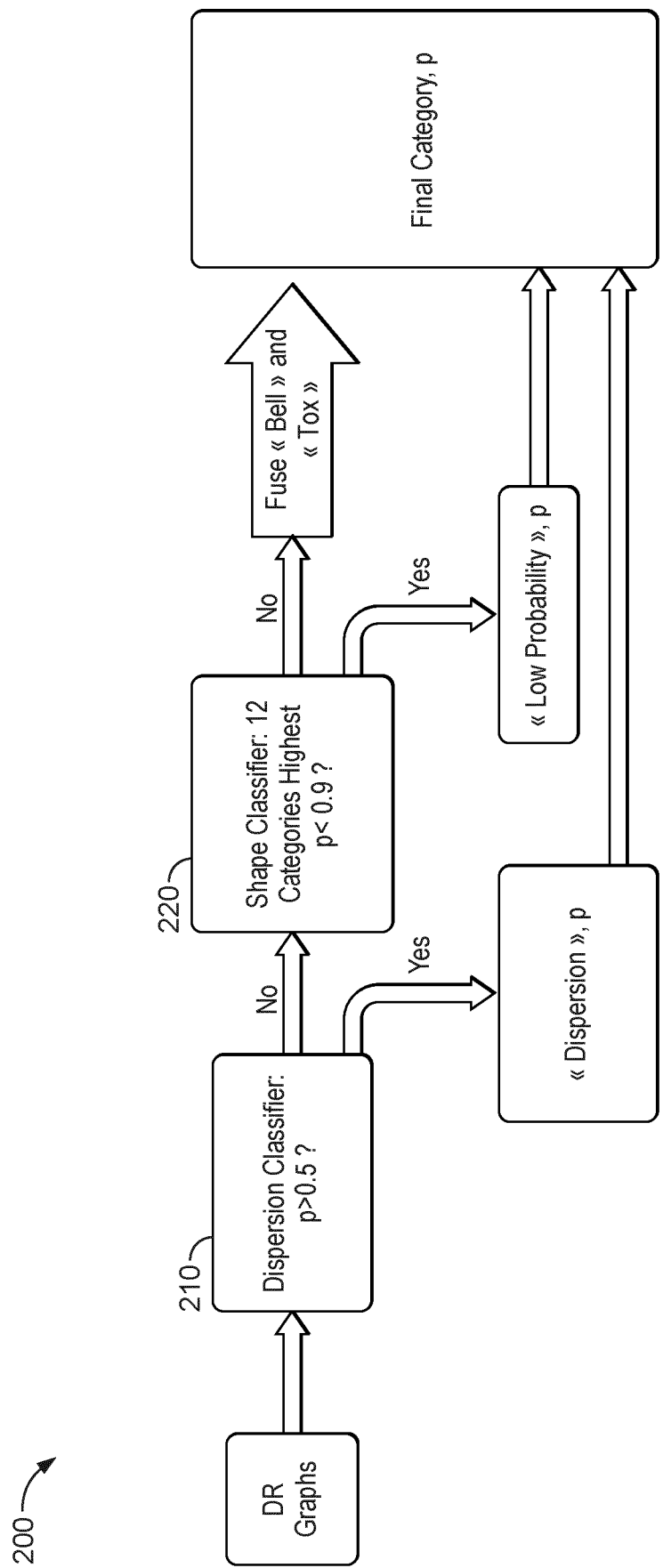
FIG. 2 illustrates a classification pipeline in accordance with an example implementation.

FIG. 2 illustrates an example classification pipeline 200 which includes a dispersion classifier 210 and a shape classifier 220. The dispersion classifier 210 acts as an initial filter and only those DR graphs which pass this filter are submitted to the shape classifier 220. More specifically, the dispersion classifier may output a probability p (a value between 0 and 1) that the dose-response graph is in the "Dispersion" category. If the probability is greater than 0.5 then the dose-response graph is classified in the "Dispersion" category. Otherwise, a normalized image of the dose-response graph is generated and input into a shape classifier which classifies the image by curve shape. Images of dose-response graphs that are classified with a probability lower than 0.9 may be assigned to a specific "low probability" category as shown.

The shape classifier may be configured to classify images of DR graphs into 12 shape categories. These 12 shape categories are the same as the 13 shape categories in sets A, B and C of FIG. 1, except that the "Bell" and "Toxicity" are fused together (i.e. treated as one combined category), since it has been found that these two categories are not always distinguished by experts.

The shape classifier 220 may comprise a convolutional neural network (CNN) which takes an image of a DR graph as input and which generates a classification output. Convolutional neural networks are known per se to those skilled in the art and will not be described in detail here. Reference is directed to LeCun, Y.; Bengio, Y.; Hinton, G. Deep learning. Nature 2015, 521, 436-444.

The classification output produced by the CNN may include a probability for each of the 12 shape categories, each probability being a likelihood that the DR graph belongs to the respective category. Alternatively, or in addition, the classification output may comprise an indication of the category with the highest probability, unless that probability is less than 0.9 in which case the DR graph is classified as "low probability".

The dispersion classifier 210 is a binary classifier in that it classifies into two possible categories. It may comprise a multi-layer perceptron (MLP) classifier which takes as input statistical features extracted from the raw data for a DR graph and which outputs a probability that the DR graph belongs to the dispersion category. For example, to process a DR graph using the dispersion classifier, the positive difference in A(c) between replicates at each concentration may be extracted, and the q1, q2 and q3 quartiles may be computed for this distribution, as well the interquartile range. These four descriptors may be normalized between 0 and 1 using a MinMax scaling, and the four normalized values may be used as input to the classifier.

Shape Classifier Pre-Processing

Image may be received by the shape classifier either in a training phase in which training images are used to train the model, or in a prediction phase in which "new" DR graph images which were not seen during training are classified. In either phase, the input images may be generated from raw DR graph data by generating a grayscale image depicting the set of data points for the DR graph relative to Cartesian (e.g. X-Y) axes. The generated images may be normalized in that each image may be generated to have the same size (e.g. 150×150 pixels) with the X and Y axes in the same position in each image. Further, the generated images may be normalized in that the Y axes (activity) is labelled with the same ticks or values in the same position in each image (e.g. values between −50 and 150). On the other hand, ticks or values may be omitted from the X axis (concentration) and different images need not relate to the same range of concentration values and may have different numbers of data points. In order to depict data on the normalized "frame" defined by the image, the raw data may be normalized by removing/filtering data points which fall outside that "frame". Various examples of DR graph images are shown in FIG. 1.

Converting DR graphs into images for processing by the CNN reduces the impact of any lack of homogeneity between different DR graph samples, e.g. between DR graph samples used in inference compared to the training set. It provides for a flexible classifier which can handle DR graphs with e.g. different number of data points (e.g. 8, 10 or 12 concentrations), missing points and/or with different numbers of replicates (which results in different numbers of Y values for some concentration values).

Training Data

DR graphs for training purposes may be obtained from existing data sources or generated algorithmically. DR graphs may be manually labelled by experts into one of the 14 categories shown FIG. 1. The resulting label may be represented as a vector and stored as "ground truth" data.

Algorithmically generating a DR graph may include generating synthetic dose-response data using the Hill equation, using parameters within a particular parameter space for each category label. The parameter space for a category label may for example comprise the position of an inflexion point, the slope at the inflexion point, and the positions of the top and bottom asymptotes. Noise and/or defects may be added.

In particular, DR graphs whose category belongs to the "Clearly Active" and "Clearly Inactive" ensembles may be built based on the Hill equation. "Bells" and "Waves" curves may be generated by combining 2 or 3 Hill functions respectively. "Toxicity" and "Last Up" may be generated by adding the appropriate noise on A(c) at the highest concentrations, using curves coming from respectively the categories in the "Clearly Active" and "Clearly Inactive" categories. Ten concentrations may be used, and two replicates per concentration may be generated using logarithmic noise. In order to have a realistic noise distribution between replicates, statistics may be determined based on the differences between replicates using the results of experimental HTS DR campaign(s). Based on a fit of the noise distribution to a logarithmic law, the associated parameters may be extracted and the resulting parametrized function may be used to model the noise between replicates. Normal noise may be added on concentrations, and uniform noise on A(c) over the whole range of concentrations.

Training images for training the shape classifier may be obtained from existing or algorithmically generated DR graphs using the preprocessing steps described above. Thus, each training image may comprise a 150×150 pixel grayscale pixel image depicting a set of data points for a DR graph relative to Cartesian axis. Each training image may be stored alongside a "ground truth" label for the training image which indicates the classification decision of an expert (or more than one expert) for the DR graph represented by the image.

Figure 3:
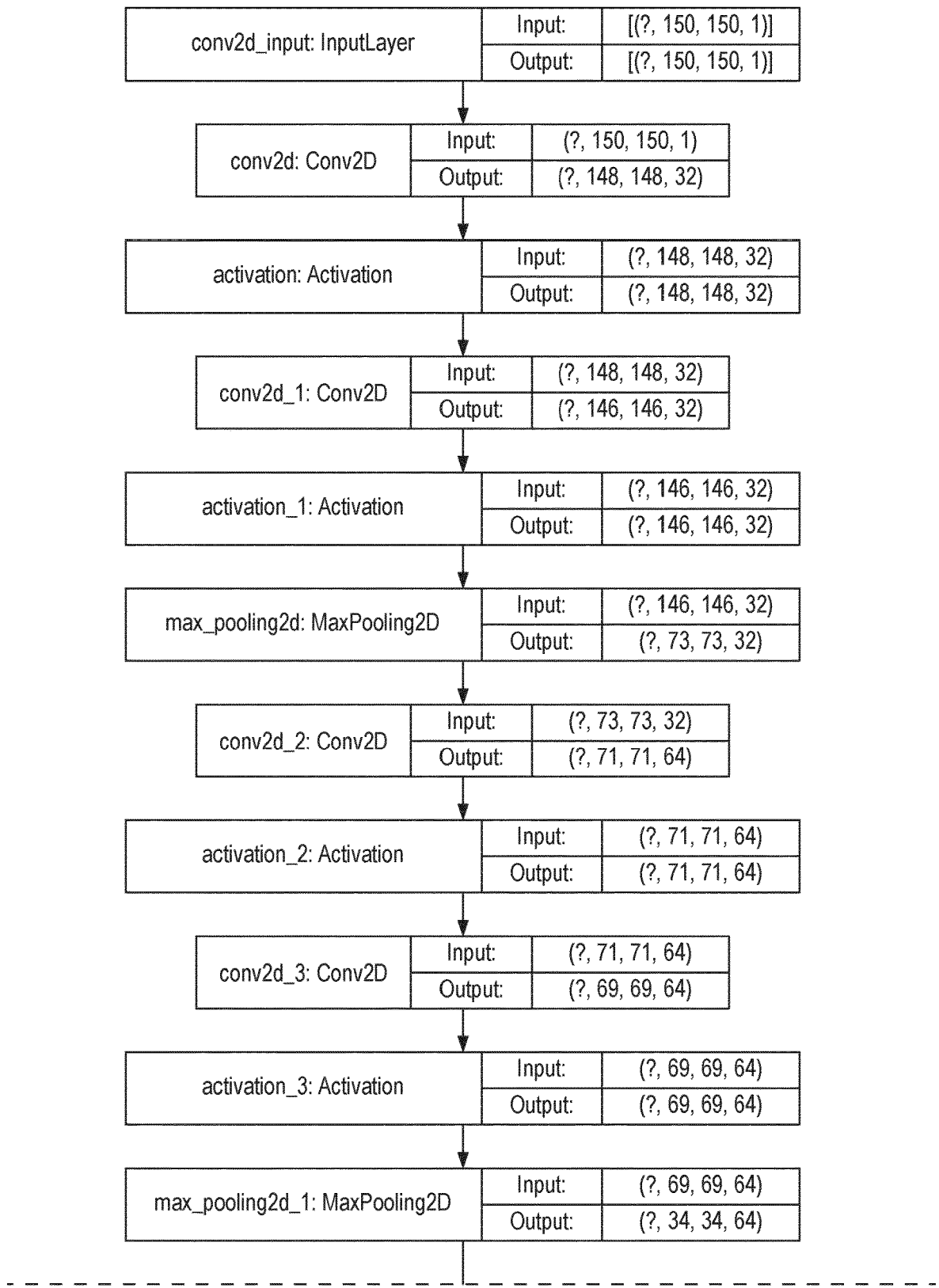
FIG. 3 illustrates an architecture of a neural network shape classifier in accordance with an example embodiment.
Figure 3:
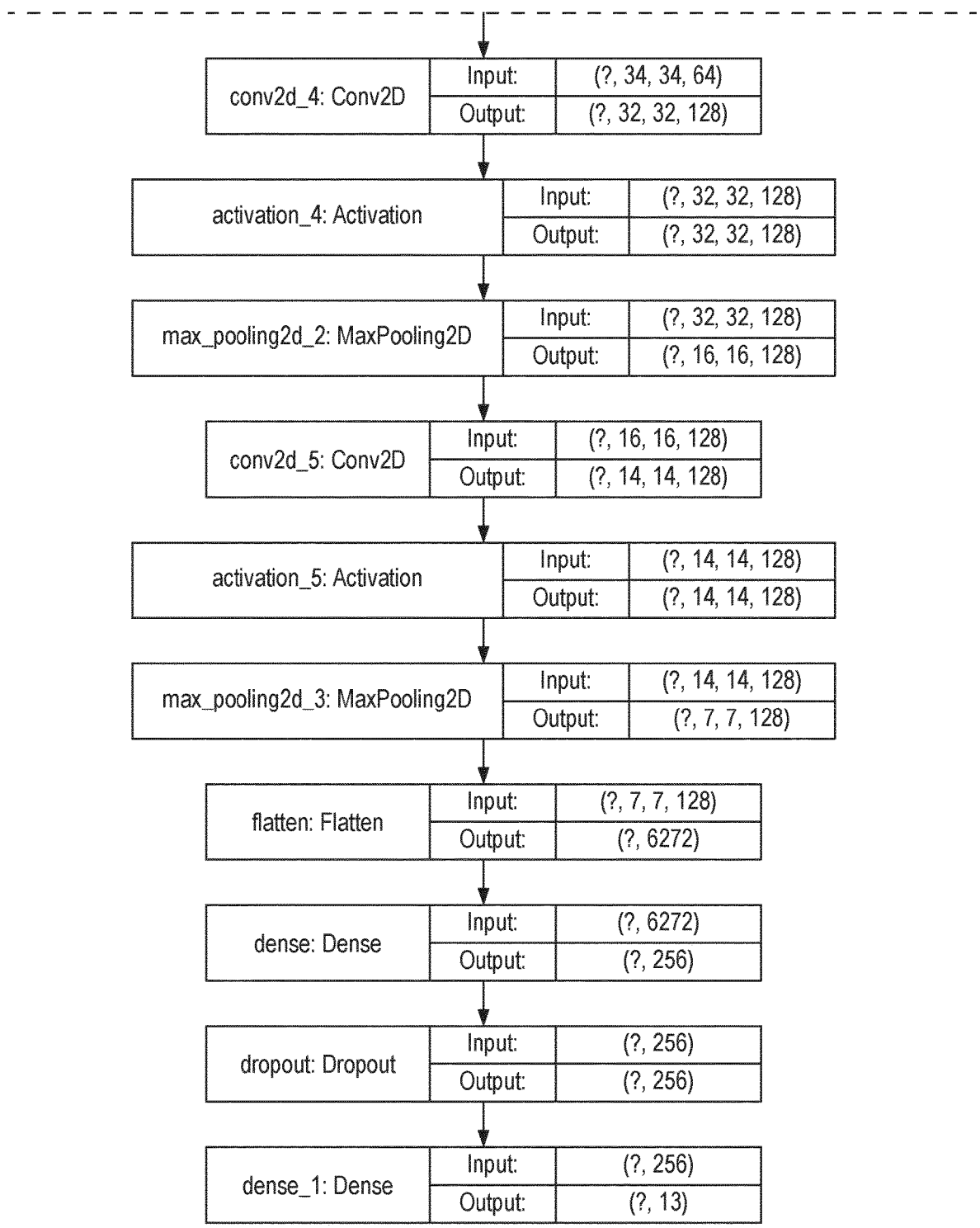

Shape classifier architecture and training One example architecture for the shape classifier is represented in FIG. 3. In summary it includes:
- One block containing six 2D convolutional layers with Relu activation and 12 regularization using 3,3 filters (32,32,64,64,128,128);
- Four 2D MaxPooling layers of size (2,2);
- Five batch normalization layers;
- One flatten layer;
- One dense layer of 256 neurons with Relu activation and 12 regularization;
- One batch normalization layer;
- One dropout layer with a 0.5 coefficient;
- One final dense layer with 13 output categories over a Softmax activation.

It will be appreciated by those skilled in the art that many variations and modifications to the architecture shown in FIG. 3 are possible.

Note that the "?" in FIG. 3 refers to the number of training examples processed at a time by the neural network and indicates that any suitable number could be used.

The shape classifier may be trained using a training set comprising several thousand (e.g. 5000) DR graph images per category. The training images may be generated from algorithmically generated DR graphs which are manually labelled with "ground truth" classification labels as described above. Training images may be generated for each of the 13 shape categories discussed above.

During training, training images are received at the input layer of the neural network model (see FIG. 3). Each training image is processed through the subsequent layers of the neural network model in accordance with parameters of the neural network model to generate probabilities for being in each of the 13 shape categories shown in sets A, B and C of FIG. 1. The parameters (i.e. neuron weights and biases) of the neural network may be updated by optimising an objective function. The objective function comprises a loss dependent on a comparison between the generated output for each training image with corresponding label data associated with the training image. The label data may comprise a vector representing the "ground truth" label which was applied following visual inspection of the training image by an expert (or a group of experts).

The loss may measure a mean-squared error between the output for each training image and the "ground truth" label data. The objective function may additionally comprise a regularization term, for example the objective function may be a linear combination of the loss and the regularization term. Other weighted losses may be included as part of the objective function. The objective function may be optimized using gradient-based methods such as the Adam optimizer, stochastic gradient descent, mini-batch gradient descent, or batch gradient descent.

In one example the Adam optimizer was used with a learning rate of 1.0E-4 and a learning rate decay of 3.0E-7. Training was measured by the validation loss, and was run for 300 epochs maximum with an early stopping on the total validation loss (Patience=5, delta=0.001). Input data was partitioned 80/20 between training and validation sets.

The training process produces a trained shape classifier model. Once trained, the model may be used to classify "new" DR graph images. For a DR graph image under test, the trained model may generate a classification output comprising a probability for each of 12 shape categories, the 12 shape categories being the same as the 13 shape categories in sets A, B and C of FIG. 1, except that the "Bell" and "Toxicity" (which are kept separate in training) are fused together for inference (i.e. treated as one combined category). Alternatively, or in addition, the classification output may comprise an indication of the category with the highest probability, or an indication of the two (or more) most probable categories.

Use of a convolutional neural network for the shape classifier is beneficial in allowing the classifier to focus on the general curve shape rather than on the details. However, in alternative implementations, other neural network architectures could be used such as a fully connected neural network.

Dispersion Classifier Architecture and Training

Figure 4:
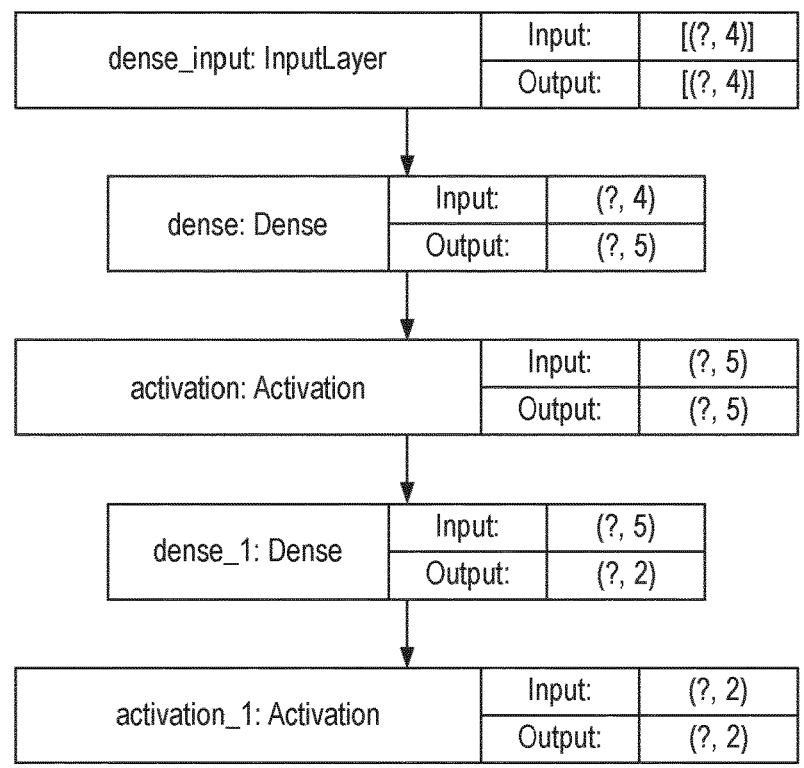
FIG. 4 illustrates an architecture of a neural network dispersion classifier in accordance with an example embodiment.

One example architecture for the dispersion classifier is represented in FIG. 4. The classifier comprises a multi-layer perceptron (MLP) classifier. It comprises 2 hidden layers, each having 5 neurons and Relu activation.

It will be appreciated by those skilled in the art that many variations and modifications to this architecture are possible.

Note that the "?" in FIG. 4 refers to the number of training examples processed at a time by the neural network and indicates that any suitable number could be used.

The classifier may be trained using a training set comprising several thousand (e.g. 5000) DR graphs per category. For each DR graph of the training set, the positive difference between two replicates at each concentration may be extracted, and the q1, q2, q3 quartiles may be computed from this distribution together with the interquartile range. This may be extended to an arbitrary number of doses by calculating the positive difference between all replicate at each concentration and by using the distribution of all of these differences in the calculation of the q1, q2 and q3 quartiles and the interquartile range.

The four descriptors may be normalized between 0 and 1 using a MinMax scaling, and the 4 normalized values may be used as the input of the MLP classifier.

An advantage of this approach is that there is no constraint with respect to the number of data points to consider, which means that the classifier is effective even if some data points are missing or if the number of concentrations are different between inputs to the dispersion classifier (or between inputs used for prediction and the training data). This benefit is synergistic with the use of images as input to the shape classifier and facilitates a flexible classification pipeline which reduces the impact of any inhomogeneity in the input data.

The input is processed through the layers of the classifier in accordance with the parameters of the classifier to generate a classification output. The parameters (i.e. neuron weights and biases) of the classifier may be updated by optimising an objective function. The objective function comprises a loss dependent on a comparison between the generated output for each training DR graph and the corresponding label data associated with training DR graph. The label data may comprise a binary value representing the "ground truth" label which was applied following visual inspection of the training image by an expert (i.e. whether the DR graph was classified in the "Dispersion" category by the expert or not).

The loss may measure a mean-squared error between the output for each training image and the "ground truth" label data. The objective function may additionally comprise a regularization term, for example the objective function may be a linear combination of the loss and the regularization term. Other weighted losses may be included as part of the objective function. The objective function may be optimized using gradient-based methods, e.g. stochastic gradient descent. Training may be performed using an 80/20 partition between the training and the validation sets.

Use of an MLP architecture for the dispersion classifier has been found to be advantageous, however other machine learning models could be used, for example a random forest model.

Figure 5:
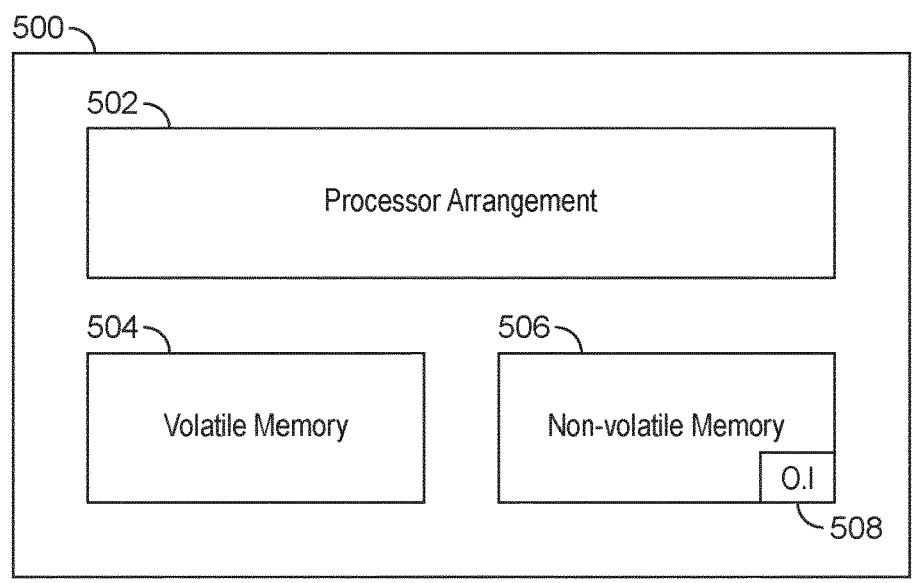
FIG. 5 is a schematic illustration of a system/apparatus for performing methods described herein.

FIG. 5 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a central processing unit (CPU) or a graphical processing unit (GPU). Alternatively, the one or more processors 502 may comprise specialised processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to temporarily store data generated during execution of said operating instructions 508.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short-or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders.

Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu(B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N-(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present disclosure, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Many modifications and variations to the embodiments described herein will be evident to those skilled in the art, which fall within the definition of the following claims:

The invention claimed is:

1. A computer-implemented method of classifying images comprising dose-response graphs obtained from dose-response experiments, comprising:
   receiving, at a curve shape classifier model, an input comprising image data including a plurality of pixels, wherein the image data represents an image of a dose-response graph indicating a relationship between a concentration of a compound and its activity, wherein the curve shape classifier model comprises a neural network model configured for classifying images of dose-response graphs into a plurality of dose-response graph categories relating to curve shape;
   generating, using the neural network model, a classification output for the image represented by the received image data, the generating comprising processing the image data using one or more layers of the neural network model in accordance with parameters associated with the one or more layers; and
   classifying a dose-response graph into a first or second dispersion category based on differences between measures of activity at the same concentration.

2. The computer-implemented method of claim 1, wherein the curve shape classifier model comprises a convolutional neural network model.

3. The computer-implemented method of claim 1, wherein image data representing an image of the dose-response graph is processed using the curve shape classifier model if the dose-response graph is classified in the first dispersion category.

4. The computer-implemented method of claim 1, wherein the dose-response graph is classified into a first or second dispersion category based on quartile values over a difference in measures of activity as a function of concentration.

5. The computer-implemented method of claim 1, comprising classifying the dose-response graph into a first or second dispersion category using a dispersion classifier comprising a multi-layer perceptron neural network model.

6. The computer-implemented method of claim 1, wherein the plurality of dose-response graph categories includes one or more of:
   a category for high activity across the whole concentration range;
   a category for sigmoid curves in which an upper asymptotic part is visible but a lower asymptotic part is not;
   a category for well behaved sigmoid curves which include lower and upper asymptotic parts;
   a category for sigmoid curves in which the lower asymptotic part is visible but an upper asymptotic part is not, and which reaches a 50% activity threshold, wherein part of the dose-response graph after an inflexion point is visible;
   a category for weakly active compounds in the concentration range of the dose-response graph;
   a category for non-active compounds in the concentration range of the dose-response graph;
   a high slope category for sigmoid curves with a high slope at an $EC_{50}$;
   a low slope category for sigmoid curves with a low slope at the $EC_{50}$;
   a category for sigmoid curves in which a difference between A (c) at upper and lower asymptotes is less than 70%;
   a category in which there is an alternative increase and decrease of activity with respect to concentration; and
   a category in which no activity is shown except for the highest concentration or two highest concentrations.

7. The computer-implemented method of claim 1, further comprising performing pre-processing including receiving raw data representing a set of data points for the dose-response graph and generating the image of the dose-response graph based on the raw data.

8. The computer-implemented method of claim 7, comprising:
   receiving raw data representing a set of data points for each of a plurality of dose-response graphs.

9. The computer-implemented method of claim 8, comprising:
   generating a respective image for each dose-response graph, wherein the image comprises a plurality of pixels and depicts at least some of the respective set of data points relative to Cartesian axes, wherein each image is generated with the same pixel height and pixel width, wherein the Cartesian axes are positioned at the same location in each image.

10. The computer-implemented method of claim 9, comprising:
    receiving, at the curve shape classifier model, image data for each respective image.

11. The computer-implemented method of claim 10, wherein each image has a vertical axis with the same scale.

12. The computer-implemented method of claim 10, wherein each training image depicts a respective set of data points relative to Cartesian axes.

13. The computer-implemented method of claim 12, wherein each training image has the same pixel height and pixel width, wherein the Cartesian axes are positioned at the same location in each image.

14. A computer-implemented method of producing a curve shape classifier model for classifying dose-response graphs obtained from dose-response experiments, comprising:

receiving a plurality of training images at a neural network model, wherein each training image is an image of a dose-response graph indicating a relationship between a concentration of a compound and its activity, generating an output for each training image, wherein generating the output for a training image comprises processing the training image through one or more layers of the neural network model in accordance with parameters associated with the one or more layers, and updating the parameters based on an objective function comprising a comparison between the generated output for each training image with corresponding label data associated with the training image, the label data indicating that the training image belongs to one or more dose-response graph categories relating to curve shape, wherein the dose-response graph categories include:
a bell-shaped curve category, and
a toxicity category.

15. A data processing apparatus comprising:
one or more processors configured to perform a computer-implemented method of classifying images comprising dose-response graphs obtained from dose-response experiments, the method comprising:

receiving, at a curve shape classifier model, an input comprising image data including a plurality of pixels, wherein the image data represents an image of a dose-response graph indicating a relationship between a concentration of a compound and its activity, wherein the curve shape classifier model comprises a neural network model configured for classifying images of dose-response graphs into a plurality of dose-response graph categories relating to curve shape, and generating, using the neural network model, a classification output for the image represented by the received image data, the generating comprising processing the image data using one or more layers of the neural network model in accordance with parameters associated with the one or more layers; and classifying a dose-response graph into a first or second dispersion category based on differences between measures of activity at the same concentration.

16. The data processing apparatus of claim 15, wherein the method comprises updating the parameters based on an objective function comprising a comparison between the generated output for each training image with corresponding label data associated with the training image, the label data indicating that the training image belongs to one or more dose-response graph categories relating to curve shape.

17. A non-transitory computer-readable storage medium comprising instructions, which when executed by one or more processors, cause the one or more processors to perform a computer-implemented method of classifying images comprising dose-response graphs obtained from dose-response experiments, the method comprising:

receiving, at a curve shape classifier model, an input comprising image data including a plurality of pixels, wherein the image data represents an image of a dose-response graph indicating a relationship between a concentration of a compound and its activity, wherein the curve shape classifier model comprises a neural network model configured for classifying images of dose-response graphs into a plurality of dose-response graph categories relating to curve shape;

generating, using the neural network model, a classification output for the image represented by the received image data, the generating comprising processing the image data using one or more layers of the neural network model in accordance with parameters associated with the one or more layers; and classifying a dose-response graph into a first or second dispersion category based on differences between measures of activity at the same concentration.

18. The non-transitory computer-readable storage medium of claim 17, wherein the method comprises updating the parameters based on an objective function comprising a comparison between the generated output for each training image with corresponding label data associated with the training image, the label data indicating that the training image belongs to one or more dose-response graph categories relating to curve shape.

* * * * *